US011277445B2

(12) United States Patent
Povey et al.

(10) Patent No.: US 11,277,445 B2
(45) Date of Patent: Mar. 15, 2022

(54) PROGRAMMING TARGET DEVICES

(71) Applicant: SECURE THINGZ LIMITED, Cambridge (GB)

(72) Inventors: Haydn Povey, Cambridge (GB); Steve Pancoast, Cedar Park, TX (US); Timothy John Woodruff, Cambridge (GB)

(73) Assignee: Secure Thingz Limited, Cambridge (GB)

(*) Notice: Subject to any disclaimer, the term of this patent is extended or adjusted under 35 U.S.C. 154(b) by 0 days.

(21) Appl. No.: 16/475,369

(22) PCT Filed: Feb. 21, 2019

(86) PCT No.: PCT/GB2019/050477
§ 371 (c)(1),
(2) Date: Jul. 1, 2019

(87) PCT Pub. No.: WO2019/162675
PCT Pub. Date: Aug. 29, 2019

(65) Prior Publication Data
US 2021/0105303 A1    Apr. 8, 2021

(30) Foreign Application Priority Data
Feb. 23, 2018 (GB) .................................. 1802975.1

(51) Int. Cl.
*H04L 29/06* (2006.01)
*H04L 9/08* (2006.01)
*H04L 9/32* (2006.01)

(52) U.S. Cl.
CPC ............ *H04L 63/20* (2013.01); *H04L 9/0819* (2013.01); *H04L 9/3247* (2013.01)

(58) Field of Classification Search
CPC ...... H04L 63/20; H04L 9/0819; H04L 9/3247
(Continued)

(56) References Cited

U.S. PATENT DOCUMENTS

| 8,161,520 B1 | 4/2012 | Brunette et al. |
| 2008/0141243 A1 | 6/2008 | Sheppard et al. |

(Continued)

FOREIGN PATENT DOCUMENTS

GB    2543096 A    4/2017

OTHER PUBLICATIONS

International Search Report and Written Opinion for Int'l Application No. PCT/GB2019/050477, titled: Programming Target Devices, dated May 7, 2019.
(Continued)

*Primary Examiner* — Anthony D Brown
(74) *Attorney, Agent, or Firm* — Hamilton, Brook, Smith & Reynolds, P.C.

(57) ABSTRACT

A security profile for programming target devices may be provided. A base security profile may be obtained that defines security parameter(s) having a configurable value. A first security profile, generated from the base security profile, may include security parameter(s) that are assigned with a value of a first set of values by: (i) retrieving the value of the first set of values from a first data storage location coupled to a computing device and setting the configurable value of the security parameter using the retrieved value, or (ii) associating the security parameter with an instruction to obtain the value of the first set of values and set the configurable value of the security parameter using the obtained value, the instruction selected from one or more instructions. A second security profile may be generated from the base security profile in response to receiving further input from for the security parameter(s).

25 Claims, 4 Drawing Sheets

(58) Field of Classification Search
USPC .............................................................. 726/1
See application file for complete search history.

(56) References Cited

U.S. PATENT DOCUMENTS

| | | |
|---|---|---|
| 2009/0104890 A1* | 4/2009 | Wang .................. H04W 12/108 |
| | | 455/410 |
| 2011/0016298 A1 | 1/2011 | McCollom |
| 2014/0033268 A1 | 1/2014 | Julisch et al. |
| 2015/0347746 A1* | 12/2015 | Martel .................... G06F 21/53 |
| | | 726/1 |
| 2016/0057134 A1 | 2/2016 | Falk et al. |
| 2017/0153880 A1 | 6/2017 | Chen et al. |
| 2018/0034682 A1 | 2/2018 | Gulati |

OTHER PUBLICATIONS

UK Search Report for UK Application No. GB1802975.1, dated Aug. 22, 2018.

* cited by examiner

PROGRAMMING TARGET DEVICES

This application is the U.S. National Stage of International Application No. PCT/GB2019/050477, filed Feb. 21, 2019, which designates the U.S. and claims priority under 35 U.S.C. § 119 or 365(c) to Great Britain Application No. 1802975.1, filed Feb. 23, 2018. The entire teachings of the above applications are incorporated herein by reference.

TECHNICAL FIELD

The present disclosure relates to programming at least one target device, in particular providing a security profile for programming at least one target device.

BACKGROUND

Deployment of computer software code onto one or more target computing devices is typically carried out in multiple phases.

During a development phase, developers write application software code and make changes to the written application software code. During a test phase, human testers test the application software code and once all tests have been completed, the process proceeds to a production phase whereby the tested application software code is deployed on the target devices for use by end-users. In the production phase, rather than immediately deploying the application software code to all target devices, it may be deployed to a smaller pool of target devices first, and then either deployed to all target devices or gradually deployed in phases, in order to catch any last-minute problems.

In addition to the application software code, security information is needed to configure the target devices. The security information may be deployed onto the target devices, for example for each target device, a digital certificate (also commonly referred to as a cryptographic certificate) is typically deployed onto the target device.

For security reasons, in each phase of the deployment of computer software code onto one or more target computing devices, different security information is used. For example, developers use development cryptographic keys for use in developing the application software code but are not given access to production cryptographic keys.

SUMMARY

The security information needed to configure the target devices must be created by a security officer for each phase of the deployment of the computer software code onto the target devices.

The inventors have recognised that this manual process is slow and leads to inaccuracies in the security information being provided for configuring the target devices in a particular phase. This is due to the security officer having to remember each of the security parameters in the security information that must be configured for each deployment phase.

The inventors have recognised that this can lead to a target device being configured with security information that renders the target device unable to perform security functions (e.g. unable to validate a digital certificate received from another computing device and therefore be unable to establish a communication link with the other computing device). This results in the deployment of the computer software code being inefficient as human resource is needed to diagnose which of the security parameters in the security information have been incorrectly configured for the particular deployment phase.

According to one aspect method of providing a security profile for programming at least one target device, the method implemented on a computing device and comprising: obtaining a base security profile, the base security profile defining at least one security parameter having a configurable value, generating a first security profile from the base security profile in response to receiving input from a user via an input device of the computing device, wherein generating the first security profile comprises, for each of the at least one security parameter, assigning the security parameter with a value of a first set of values by: (i) retrieving the value of the first set of values from a first data storage location coupled to the computing device and setting the configurable value of the security parameter using the retrieved value, or (ii) associating the security parameter with an instruction to obtain the value of the first set of values and set the configurable value of the security parameter using the obtained value, the instruction selected from one or more instructions; generating a second security profile from the base security profile in response to receiving further input from a user via said input device, wherein generating the second security profile comprises, for each of the at least one security parameter, assigning the security parameter with a value of a second set of values by: (i) retrieving the value of the second set of values from a second data storage location coupled to the computing device and setting the configurable value of the security parameter using the retrieved value, or (ii) associating the security parameter with an instruction to obtain the value of the second set of values and set the configurable value of the security parameter using the obtained value, the instruction selected from said one or more instructions, wherein the second set of values are different to the first set of values; outputting, the first security profile for programming at least one target device for use by a first type of user; and outputting the second security profile for programming at least one target device for use by a second type of user different to the first type of user.

The at least one security parameter may comprise at least one digital certificate parameter associated with a digital certificate for programming onto the at least one target device.

The at least one digital certificate parameter comprises one or more of: an issuer name parameter having a configurable value defining an issuer of the digital certificate; a validity period parameter having a configurable value defining a validity period of the digital certificate; a subject name parameter having a configurable value defining a subject of the digital certificate; a public key parameter having a configurable value defining a public key of the digital certificate; a device serial number parameter having a configurable value defining the target device onto which the digital certificate is to be programmed; and a certificate signature parameter having a configurable value defining a signature of the digital certificate.

The at least one security parameter may comprise at least one cryptographic key parameter associated with a cryptographic key for programming onto the at least one target device.

The at least one cryptographic key parameter may comprise one or more of: at least one symmetric key parameter having a configurable value defining a symmetric key; and at least one private key parameter having a configurable value defining a private key of an asymmetric key pair.

The at least one security parameter may comprise at least one processor parameter for programming a processing unit on each of the at least one target device.

The at least one processor parameter comprises one or more of: a debug interface parameter having a configurable value defining whether a debug interface on the processing unit is to be enabled or disabled; a JTAG interface parameter having a configurable value defining whether a JTAG interface on the processing unit is to be enabled or disabled; a USB interface parameter having a configurable value defining whether a USB interface on the processing unit is to be enabled or disabled; a serial interface parameter having a configurable value defining whether a serial interface on the processing unit is to be enabled or disabled; a networking interface parameter having a configurable value defining whether a networking interface on the processing unit is to be enabled or disabled; a feature enablement parameter having a configurable value defining whether a feature of application software for execution on the processing unit is to be enabled or disabled; and a read out parameter having a configurable value defining whether external access to memory coupled to the processing unit is to be enabled or disabled.

A data store may be coupled to the computing device, the data store may comprise the first data storage location and the second data storage location. The data store may be a secured data store.

An unsecured data store and a secured data store may be coupled to the computing device, the unsecured data store may comprise the first data storage location and the secured data store may comprise the second data storage location.

The secured data store may be a hardware security module.

The one more instructions may comprise at least one of: an instruction to generate the value randomly; an instruction to retrieve the value from a remote data store the instruction comprising an identifier of the remote data store and a data storage location on the remote date store; an instruction to generate the value using at least one value assigned to at least one further security parameter of the base security profile; and an instruction to generate the value based on a date or time at which the instruction is acted on; and an instruction to retrieve the value from a target device of the at least one target device.

The method may comprise: outputting the first security profile for delivery to a first data package generation module, the first data package generation module configured to generate a first programming data package based on the first security profile for output to a first device programming module for programming the at least one target device; and outputting the second security profile for delivery to a second data package generation module, the second data package generation module configured to generate a second programming data package for output to a second device programming module for programming the at least one target device.

The first security profile may comprise at least one security parameter associated with a respective instruction, and the first data package generation module is implemented on said computing device, the method further comprising: for each of the at least one security parameter associated with a respective instruction, the first data package generation module acting on the instruction associated with the security parameter to obtain the value of the first set of values and set the configurable value of the security parameter using the obtained value The first security profile may comprise a plurality of security parameters each associated with a respective instruction, and the first data package generation module is distributed across multiple computing devices including said computing device and at least one remote computing device, the method further comprising: outputting the first security profile to a component of the first data package generation module on said computing device; for one or more of the plurality of security parameters each associated with a respective instruction, said component of the first data package generation module (i) acting on the instruction associated with the security parameter to obtain the value of the first set of values and set the configurable value of the security parameter using the obtained value; and then (ii) outputting the first security profile to a further component of the first data package generation module on a remote computing device of at least one remote computing device.

The first security profile may be output via a communications interface of the computing device for delivery to at least one remote computing device comprising the first data package generation module.

The second security profile may comprise at least one security parameter associated with a respective instruction, and the second data package generation module is implemented on said computing device, the method further comprising: for each of the at least one security parameter associated with a respective instruction, the second data package generation module acting on the instruction associated with the security parameter to obtain the value of the second set of values and set the configurable value of the security parameter using the obtained value.

The second security profile may comprise a plurality of security parameters each associated with a respective instruction, and the second data package generation module is distributed across multiple computing devices including said computing device and at least one remote computing device, the method further comprising: outputting the second security profile to a component of the second data package generation module on said computing device; for one or more of the plurality of security parameters each associated with a respective instruction, said component of the second data package generation module (i) acting on the instruction associated with the security parameter to obtain the value of the second set of values and set the configurable value of the security parameter using the obtained value; and then (ii) outputting the second security profile to a further component of the second data package generation module on a remote computing device of at least one remote computing device.

The second security profile may be output via a communications interface of the computing device for delivery to at least one remote computing device comprising the second data package generation module.

The first data package generation module may be the same as the second data package generation module, and the first device programming module may be the same as the second device programming module.

The first data package generation module and the second data package generation module may be separate modules, and the first device programming module and the second device programming module may be separate modules.

The method may further comprise the data package generation module: receiving application software; generating a programming data package based on a generated security profile and the application software, the generated security profile corresponding to the first security profile or the second security profile; encrypting the programming data package using a transfer encryption key to generate an encrypted programming data package; and outputting the encrypted programming data package to a device programming module for programming the at least one target device, the device programming module corresponding to the first device programming module or the second device programming module.

The base security profile may define at least one security parameter having a non-configurable value.

According to another aspect of the present disclosure there is provided a computer program product for providing a security profile for programming at least one target device, the program product comprising code embodied on a computer readable medium and configured so as when executed on a processing apparatus of computing device to perform the above described methods.

The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

According to another aspect of the present disclosure there is provided a computing device for providing a security profile for programming at least one target device, the computing device comprising: an input device; and a security profile generation module, the security profile generation module configured to: obtain a base security profile, the base security profile defining at least one security parameter having a configurable value, generate a first security profile from the base security profile in response to receiving input from a user via said input device, wherein generation of the first security profile comprises, for each of the at least one security parameter, the security profile generation module assigning the security parameter with a value of a first set of values by: (i) retrieving the value of the first set of values from a first data storage location coupled to the computing device and setting the configurable value of the security parameter using the retrieved value, or (ii) associating the security parameter with an instruction to obtain the value of the first set of values and set the configurable value of the security parameter using the obtained value, the instruction selected from one or more instructions; generate a second security profile from the base security profile in response to receiving further input from a user via said input device, wherein generation of the second security profile comprises, for each of the at least one security parameter, the security profile generation module assigning the security parameter with a value of a second set of values by: (i) retrieving the value of the second set of values from a second data storage location coupled to the computing device and setting the configurable value of the security parameter using the retrieved value, or (ii) associating the security parameter with an instruction to obtain the value of the second set of values and set the configurable value of the security parameter using the obtained value, the instruction selected from said one or more instructions, wherein the second set of values are different to the first set of values; output the first security profile for programming at least one target device for use by a first type of user; and output the second security profile for programming at least one target device for use by a second type of user different to the first type of user.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

Some preferred embodiments of the disclosure will now be described by way of an example only and with reference to the accompanying drawings, in which.

DETAILED DESCRIPTION

During development of application software, the security parameters associated with the application software may need to be changed to enable debugging or testing of the application software. For example, additional interfaces (e.g. USB or serial) that allow detailed progress information to be extracted from the device may be enabled, allowing faults in the application software to be identified and diagnosed. In addition the cryptographic protection of software images may use alternative certificate chain hierarchies, such that only target devices in a company's own premises will be able to load the development and test versions of these software images. In another example, cryptographic keys of a certificate chain hierarchy used in developing the application software code may need to be changed for the production phase. This advantageously prevents developers having access to the cryptographic keys that are to be programmed onto the target devices and thus preventing any malicious attempts to compromise the security of the target devices. For example, by preventing developers from having access to the cryptographic keys that are to be programmed onto the target devices, this prevents any malicious attempts to program more than an agreed number of target devices. The extra devices produced by programming more than the agreed number are known as cloned devices. Cloned devices have the effect of lowering the capability of genuine (i.e. non-cloned) target devices because servers designated to communicate with the genuine target devices may be overburdened due to requests from cloned (i.e. non-genuine) devices which may incur computational resources of the servers in the repairing, updating or servicing cloned devices.

Embodiments of the present disclosure enable security information, needed to configure target devices, to be easily and accurately changed to provide efficient programming of target devices.

Embodiments will now be described by way of example only.

Figure 1:
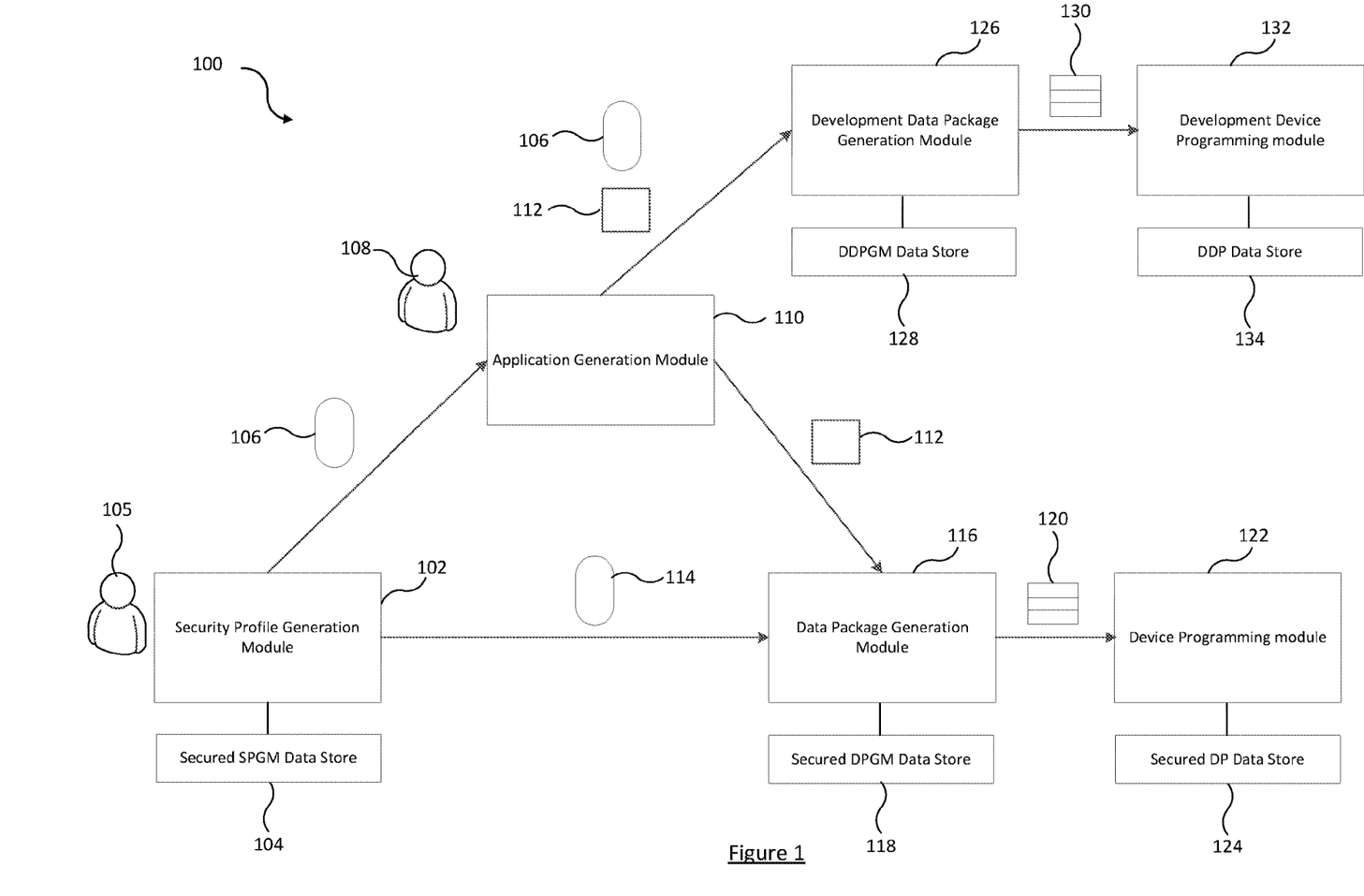
FIG. 1 shows a system for programming target devices.

Reference is first made to FIG. 1 which illustrates a system 100 for programming target devices. The term "target device" is used herein to refer to a programmable device (e.g. a microprocessor, microcontroller etc.).

The system 100 comprises a security profile generation module 102. The security profile generation module 102 is a component of a user terminal that is operated by a security officer 105. The security profile generation module 102 may be coupled (via a wired or wireless connection) to a secured data store 104.

Figure 2:
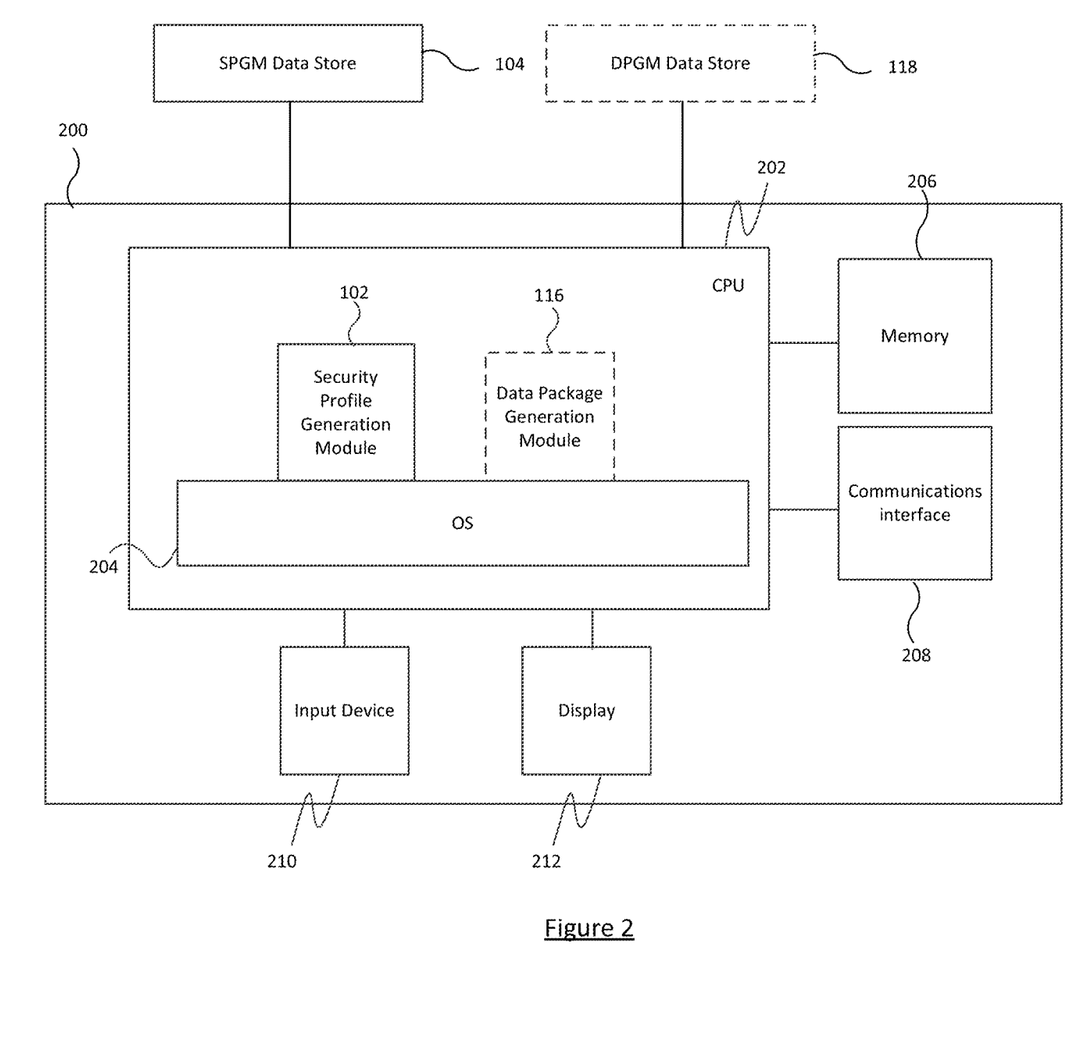
FIG. 2 illustrates a schematic block diagram of a user terminal.

FIG. 2 illustrates the user terminal 200 that is operated by the security officer 105. The user terminal 102 comprises a central processing unit ("CPU") 202, to which is connected a display 212 such as a screen or touch screen, an input device 210 such as a keyboard, mouse, touch-sensitive display, touchpad, and/or a microphone. The CPU 202 is connected to a communications interface 208 for wired or wireless communications with external computing devices. The user terminal 200 also comprises a memory 206 for storing data as is known in the art. The memory 206 may be a permanent memory, such as ROM. The memory 206 may alternatively be a temporary memory, such as RAM. The memory 206 is an unsecured data store in that it stores data in plaintext e.g. unencrypted form.

FIG. 2 also illustrates an operating system ("OS") 204 executed on the CPU 202. Running on top of the OS 204 is the security profile generation module 102. The security profile generation module 102 provides a user interface which is displayed on display 212 for the security officer 105 to interact with the security profile generation module 102. Once launched, the security officer 105 may make appropriate selections by interacting with the user interface provided by the security profile generation module 102 using one or more input device 210.

As shown in FIG. 2 the user terminal 200 may be coupled to a secured data store 104. The secured data store 104 may for example be a hardware security module (HSM).

The security profile generation module 102 is configured to generate a security profile for use in programming target devices by modifying a base security profile in response to input from the security officer 105. The term "security profile" is used herein to refer to a configuration file that a device programming module 122 can store in memory of the device programming module 122 and query and extract information from, in order to program target devices. The term "base security profile" is used herein to refer to a configuration file that is used to generate a security profile. This configuration file that is used to generate a security profile is referred to herein as a "base" security profile because it is used as form of template from which different security profiles may be generated. The base security profile can thus be considered as a base security template.

The base security profile, described in more detail below, defines a plurality of security parameters for configuring the target devices with at least one security parameter having a configurable value. The base security profile may also additionally define at least one security parameter having a non-configurable value. The base security profile is displayed in the user interface of the security profile generation module 102 which is displayed on display 212. The base security profile clearly indicates which of the security parameters in the base security profile must be configured by the security officer 105 before a security profile can be generated for use in programming the target devices.

In order to generate a security profile, each of the security parameters having a configurable value is assigned a value (which may comprise letters, numbers and/or symbols) by the security officer 105 interacting with the user interface provided by the security profile generation module 102

Each security profile that the security profile generation module 102 generates is generated from the same base security profile with different sets of values being used to assign a value to the security parameters in the base security profile which have a configurable value to generate the respective security profiles. Reference to "different sets of values" is used herein to refer to sets of values having at least one value differing between the two sets. That is, a first set of values used to generate a first security profile may have one or more values in common with a different set of values used to generate a second security profile.

The security officer 105 interacts with the user interface provided by the security profile generation module 102 to assign a value to each of the security parameters in the base security profile having a configurable value to generate a security profile The security officer 105 assigns a value to each of the security parameters profile having a configurable value by either (i) retrieving the value from a data storage location coupled to the user terminal 200, e.g. from memory 206 or the secured data store 104, and setting the configurable value of the security parameter using the retrieved value, or (ii) associating the security parameter with an instruction to obtain the value and set the configurable value of the security parameter using the obtained value.

One example security profile that the security profile generation module 102 may generate is a development profile 106. A set of development values is used by the security officer 105 to assign a value to the security parameters in the base security profile which have a configurable value.

As shown in FIG. 1, the security profile generation module 102 is configured to transmit a development profile 106 to an application generation module 110. The application generation module 110 is a component of a user terminal that is operated by a developer 108 who develops application software 112 that is to be deployed onto the target devices. The development profile 106 is used by the developer 108 during development of the application software 112. Once written, the application generation module 110 outputs both the development profile 106 and the application software 112 to a development data package generation module 126.

Once the development data package generation module 126 has received the development profile 106, the development data package generation module 126 is configured to process the development profile 106 to determine whether there are any security parameters in the development profile 106 that are associated with an instruction (rather than an actual value). For each security parameter in the development profile 106 that is associated with an instruction, the development data package generation module 126 is configured to act on the instruction to obtain the value for the security parameter and set the configurable value of the security parameter using the obtained value. That is, the development data package generation module 126 is configured to "fill in" the development profile 106 such that each security parameter in the development profile 106 is associated with a value.

Once this is complete, the development data package generation module 126 is configured to generate a development programming data package 130 for transmission to a development device programming module 132. The development programming data package 130 comprising the application software 112 and the development profile 106 (with each security parameter in the development profile 106 having an associated value) for programming target devices during a development phase. The development device programming module 132 is implemented on a computing device and is used to program the application software 112 onto target devices and to program security information onto target devices using the development profile 106 in the development programming data package 130.

The development data package generation module 126 may be implemented on one or more of (i) the user terminal that is operated by the developer 108; (ii) one or more standalone computing devices (different to both the user terminal that is operated by the developer 108 and the computing device comprising the development device programming module 132); and (iii) the computing device comprising the development device programming module 132. Expressed another way, the development data package generation module 126 may be implemented on a single computing device or distributed over multiple computing devices.

Once a development phase is complete, the security profile generation module 102 is configured to generate one or more further security profile 114.

The security profile generation module 102 is configured to transmit a generated security profile 114 to a data package generation module 116. The generated security profile 114 is for programming the target devices. The data package generation module 116 also receives the application software 112 which may be from the user terminal that is operated by a developer 108 (as shown in FIG. 1) or from user terminal 200 (if the application generation module 110 returns the application software 112 to user terminal 200 once written).

Once the data package generation module 116 has received the security profile 114, the data package generation module 116 is configured to process the security profile 114 to determine whether there are any security parameters in the security profile 114 that are associated with an instruction (rather than an actual value). For each security parameter in the security profile 114 that is associated with an instruction, the data package generation module 116 is configured to act on the instruction to obtain the value for the security parameter and set the configurable value of the security parameter using the obtained value. That is, the data package generation module 116 is configured to "fill in" the security profile 114 such that each security parameter in the development profile 106 is associated with a value.

Once this is complete, the data package generation module 116 is configured to generate a programming data package 120 for transmission to a device programming module 122. The programming data package 120 comprising the application software 112 and the generated security profile 114 (with each security parameter in the security profile 114 having an associated value). The device programming module 122 is implemented on a computing device and is used to program the application software 112 onto target devices and to program security information onto target devices using the generated security profile 114 in the programming data package 120.

The data package generation module 116 may be implemented on one or more of (i) user terminal 200; (ii) one or more standalone computing devices (different to both the user terminal 200 and the computing device comprising the device programming module 122); and (iii) the computing device comprising the device programming module 122. Expressed another way, the development data package generation module 116 may be implemented on a single computing device or distributed over multiple computing devices.

The generated security profile 114 may be a test profile. A set of test values is used by the security officer 105 to assign a value to the security parameters in the base security profile which have a configurable value in order to generate the test profile. The set of test values are different to the set of development values. In this example, the data package generation module 116 is configured to generate a test data package for transmission to the device programming module 122.

Alternatively, the generated security profile 114 may be a production profile. A set of production values is used by the security officer 105 to assign a value to the security parameters in the base security profile which have a configurable value in order to generate the production profile. The set of production values are different to the set of development values and the set of test values. In this example, the data package generation module 116 is configured to generate a production data package for transmission to the device programming module 122.

The data package generation module 116 may encrypt the generated programming data package 120 with a cryptographic key, otherwise referred to herein as a "transfer encryption key", prior to transmission to prevent unauthorized interception of the programming data package 120 during transmission from the data package generation module 116 to device programming module 122.

The cryptographic key used to encrypt the programming data package 120 may be a symmetric cryptographic key. In this example, the data package generation module 116 stores the symmetric cryptographic key used to encrypt the programming data package 120 in secured data store 118 and the device programming module 122 stores the symmetric cryptographic key used to decrypt the encrypted programming data package 120 in secured data store 124. Alternatively, the cryptographic key used to encrypt the programming data package 120 may be a public key of a linked public/private key pair. In this example, the data package generation module 116 may store the cryptographic key (the public key) used to encrypt the programming data package 120 in memory 206 (in embodiments where the data package generation module 116 is implemented on the user terminal 200) or secured data store 118, and the device programming module 122 stores the private key of the linked public/private key pair in secured data store 124. This private key is used to decrypt the encrypted programming data package 120. Note that the decryption key in the above example may be in the target device itself—for example the case when the programming data package 120 comprises an update of the application software 112, rather than the application software 112 initially programmed into the device.

For example, in an example scenario whereby the security profile generation module 102 generates a production profile using the base security profile it is desirable to encrypt the production data package with the transfer encryption key, prior to transmission to the device programming module 122 to prevent unauthorized interception of the production profile during transmission from the data package generation module 116 to the device programming module 122.

As shown in FIG. 1 the security profile generation module 102 is associated with a secured data store 104.

The development data package generation module 116 is associated with a data store 128 and the development device programming module 122 is associated with a data store 134. The data package generation module 116 is associated with a secured data store 118 and the device programming module 122 is associated with a secured data store 124.

The term "secured data store" is used herein to refer to either (i) a data store which stores data in encrypted form, for example a secured data store may be a hardware security module (HSM); or (ii) a data store which stores data in unencrypted form (i.e. plaintext) however the data store is located in a secure environment, for example the data store is located in a locked room to which only a selected number of people have access to.

As discussed above, in some embodiments, the data package generation module 116 is implemented on one or more computing device which is remote to the user terminal 200. In these embodiments, the security profile generation module 102 is configured to transmit the generated security profile 114 to the data package generation module 116 on the remote computing device via the communications interface 208. The communication link between the user terminal 200 and the remote computing device comprising the data package generation module 116 may be a wired and/or wireless communication link.

The security profile generation module 102 may encrypt the generated security profile 114 with a cryptographic key prior to transmission to prevent unauthorized interception of the security profile 114 during transmission from the user terminal 200 to the remote computing device comprising the data package generation module 116.

The cryptographic key used to encrypt the generated security profile 114 may be a symmetric cryptographic key. In this example, the security profile generation module 102 stores the symmetric cryptographic key used to encrypt the generated security profile in secured data store 104 and the data package generation module 116 stores the symmetric cryptographic key used to decrypt the encrypted security profile in secured data store 118. Alternatively, the cryptographic key used to encrypt the generated security profile 114 may be a public key of a linked public/private key pair. In this example, the security profile generation module 102 may store the cryptographic key (the public key) used to encrypt the generated security profile in memory 206 or secured data store 104, and the data package generation module 116 stores the private key of the linked public/private key pair in secured data store 118. This private key is used to decrypt the encrypted security profile.

Figure 3:
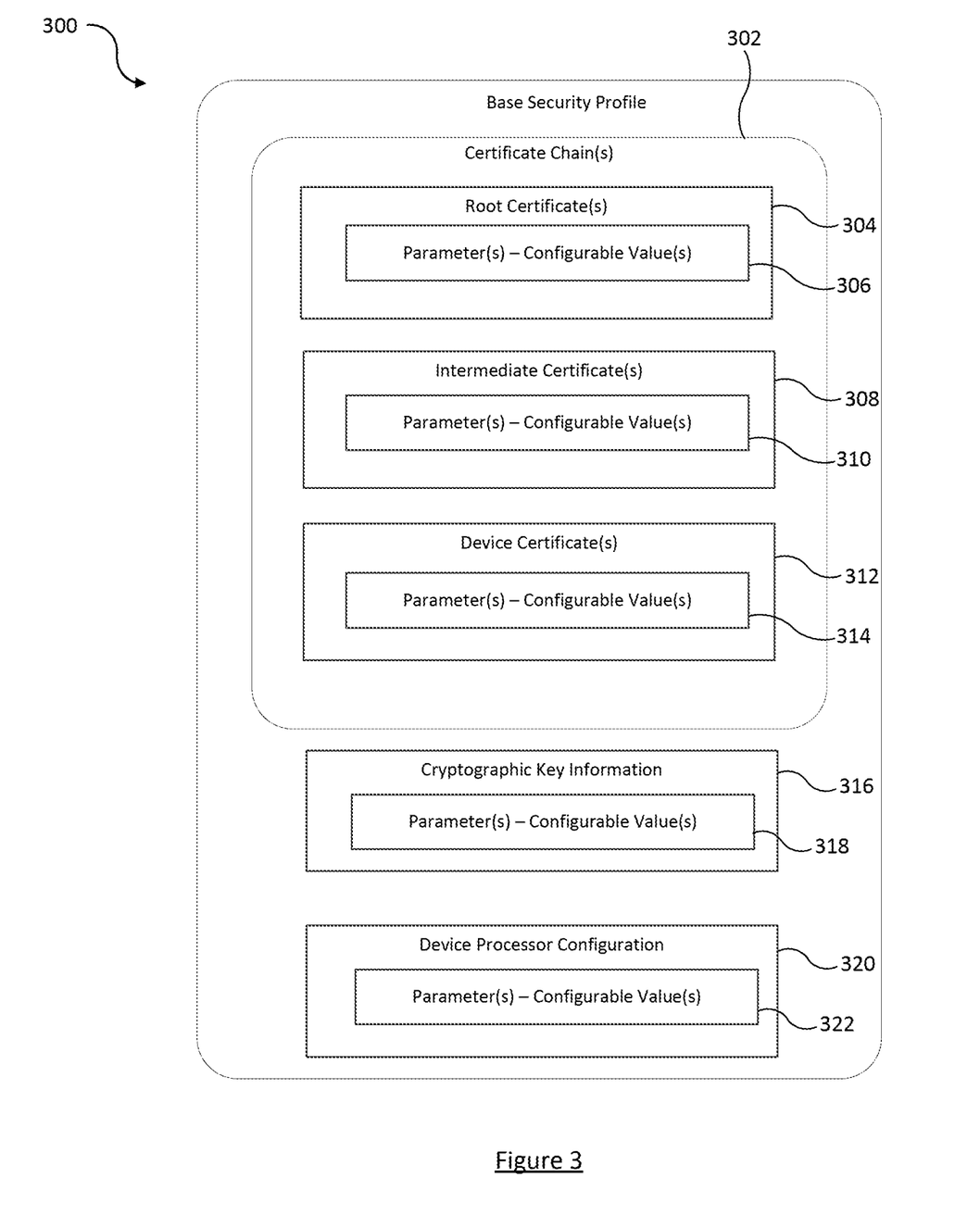
FIG. 3 shows a schematic block diagram of an example base security profile.

Reference is now made to FIG. 3 which illustrates an example base security profile used to generate a security profile in embodiments of the present disclosure.

The base security profile 300 defines a plurality of security parameters.

The plurality of security parameters in the base security profile 300 comprise at least one security parameter having a configurable value. That is, when the security officer 105 interacts with the user interface provided by the security profile generation module 102 the security officer 105 is able to modify the value associated with these particular security parameters in the base security profile 300.

Thus for the security parameter(s) having a configurable value in the base security profile 300, the security officer 105 is able to modify the base security profile 300 using a first set of values that are to be substituted into, and/or referenced in the base security profile to generate a first security profile for programming the target devices for use by a first type of user (e.g. a development profile for programming the target devices for a developer to check the operation of their application software); and then, using the same base security profile 300, use a different set of values that are to be substituted into, and/or referenced in the base security profile to generate a different security profile for programming the target devices for use by a different type of user (e.g. a production profile for programming the target devices for use by end-users of the target devices).

The security parameter(s) having a configurable value in the base security profile 300 may comprises one or more of: at least one digital certificate parameter associated with digital certificates for programming onto the target devices; at least one cryptographic key parameter associated with a cryptographic key for programming onto the at least one target device; and at least one processor parameter for programming a processing unit on each of the at least one target device.

As noted above, the security parameter(s) having a configurable value in the base security profile 300 may comprises at least one digital certificate parameter associated with digital certificates for programming onto the target devices.

As is well known in the art digital certificates are verified using a certificate chain.

The digital certificate parameter(s) having configurable values are associated with one or more certificate chains 302. A certificate chain 302 typically comprises a root certificate 304, one or more intermediate certificates 308, and one or more device certificates 312.

Each target device is programmed with at least a unique device certificate 312, and may additionally be programmed with one or more intermediate certificate 308 and/or a root certificate 304.

The digital certificate parameter(s) having configurable values in the base security profile 300 are associated with one or more of the certificates that are to be programmed onto the target devices.

That is, the base security profile 300 comprises device certificate parameter(s) 314 having configurable values in the base security profile 300 that are associated with device certificates 312 that are to be programmed onto the target devices. The base security profile 300 may additionally comprise intermediate certificate parameter(s) 310 having configurable values in the base security profile 300 that are associated with intermediate certificates 308 that are to be programmed onto the target devices and/or root certificate parameter(s) 306 having configurable values in the base security profile 300 that are associated with root certificates 304 that are to be programmed onto the target devices.

Each of the device certificate parameter(s) 314, intermediate certificate parameter(s) 310, and root certificate parameter(s) 306 may comprise one or more of the following: (i) an issuer name parameter having a configurable value defining an issuer of the digital certificate; (ii) a validity period parameter having a configurable value defining a validity period of the digital certificate; (iii) a subject name parameter having a configurable value defining a subject of the digital certificate; (iv) a public key parameter having a configurable value defining a public key of the digital certificate; (v) a device serial number parameter having a configurable value defining the target device onto which the digital certificate is to be programmed; and (vi) a certificate signature parameter having a configurable value defining a signature of the digital certificate. It will be appreciated that these are merely example certificate parameters in the base security profile 300 which may have a configurable value and embodiments extend to other certificate parameters not referred to here.

As an example, when generating a development profile from the base security profile 300 using the security profile generation module 102 the security office 105 may assign the validity period parameter 314 with a value indicating a limited validity period (e.g. one week or one month) of the device certificates that are to be programmed on the target devices, whereas when generating a production profile from the base security profile 300 using the security profile generation module 102 the security office 105 may assign the validity period parameter 314 with a value indicating an unlimited validity period of the device certificates that are to be programmed on the target devices such that the device certificate.

Additionally or alternatively, the base security profile 300 may comprise cryptographic key information 316 for deployment of one or more cryptographic keys onto each of the of the target devices. For each target device, the cryptographic key information 316 comprises at least one cryptographic key parameter 322 associated with a cryptographic key for programming onto that target device.

The at least one cryptographic key parameter 322 associated with a target device may comprise a symmetric key parameter having a configurable value defining a symmetric key for programming onto the target device for use, by the target device, in communications with other computing devices. The at least one cryptographic key parameter 322 associated with a target device may comprise a private key parameter having a configurable value defining a private key of an asymmetric key pair, for programming onto the target device for use, by the target device, in decrypting information received from other computing devices.

Additionally or alternatively, the base security profile 300 may comprise device processor configuration information 320 which is used to configure security settings of a processing unit on each of the target devices. The device processor configuration information 320 comprises at least one processor parameter 322 having a configurable value for programming a processing unit on each of the target devices.

The at least one processor parameter 322 may comprise one or more of: (i) a debug interface parameter having a configurable value defining whether a debug interface on the processing unit is to be enabled or disabled; (ii) a JTAG (joint test action group) interface parameter having a configurable value defining whether a JTAG interface on the processing unit is to be enabled or disabled; (iii) a USB interface parameter having a configurable value defining whether a USB interface on the processing unit is to be enabled or disabled; (iv) a serial interface parameter having a configurable value defining whether a serial interface on the processing unit is to be enabled or disabled; (v) a networking interface parameter having a configurable value defining whether a networking interface on the processing unit is to be enabled or disabled; (vi) a feature enablement parameter having a configurable value defining whether a feature of application software for execution on the processing unit is to be enabled or disabled; and (vii) a read out parameter having a configurable value defining whether external access to memory coupled to the processing unit is to be enabled or disabled (e.g. a lockdown parameter).

As an example, when generating a development profile from the base security profile 300 using the security profile generation module 102 the security office 105 may assign the configurable value of the debug interface parameter to a value that enables the debug interface on the processing unit (to allow the developers to perform debugging operations on the application software programmed onto the target devices), whereas when generating a production profile from the base security profile 300 using the security profile generation module 102 the security office 105 may assign the configurable value of the debug interface parameter to a value that disables the debug interface on the processing unit (to prevent end-users from perform debugging operations on the application software programmed onto the target devices).

The plurality of security parameters in the base security profile 300 may comprise at least one security parameter having a non-configurable value. That is, when the security officer 105 interacts with the user interface provided by the security profile generation module 102 the security officer 105 is unable to modify the value associated with these particular security parameters in the base security profile 300. That is, whenever a security profile is generated using the base security profile 300 the security profile comprises the security parameter(s) having these non-configurable value(s).

Figure 4:
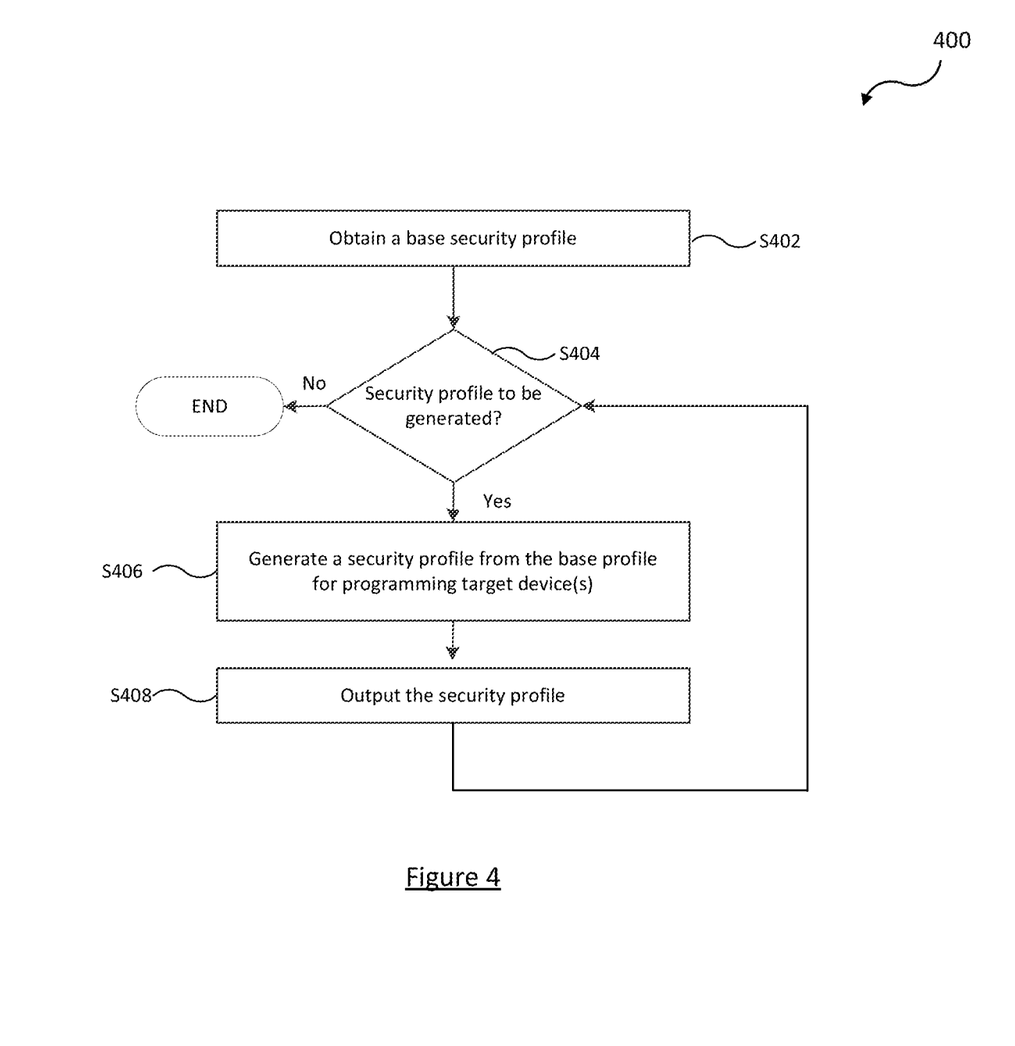
FIG. 4 is a flow chart for a process for providing a security profile for programming at least one target device.

FIG. 4 is a flow chart for a process for providing a security profile for programming at least one target device. The steps shown in FIG. 4 are implemented by the security profile generation module 102.

At step S402 the security profile generation module 102 obtains a base security profile 300. The security profile generation module 102 may obtain the base security profile 300 by retrieving the base security profile 300 from memory 206 that has been previously created. Alternatively base security profile 300 may obtain the base security profile 300 by generating the base security profile 300 in response to the security officer 105 making appropriate selections by interacting with the user interface provided by the security profile generation module 102 using one or more input device 210.

At step S404 the security profile generation module 102 determines if a security profile is to be generated in response to determining whether or not a set of values to be substituted into, and/or referenced in, the base security profile 300 has been input by the security officer 105.

If a set of values to be substituted into, and/or referenced in, the base security profile 300 has been input by the security officer 105 the process proceeds to step S406 whereby the security officer 105 interacts with the user interface provided by the security profile generation module 102 to assign a value to each of the security parameters in the base security profile having a configurable value to generate a security profile which may be, for example a development profile, test profile or production profile. It will be appreciated that reference to these types of security profile are merely to illustrate the concept and additional or alternative types of security profile may be generated by the security profile generation module 102 from the base security profile 300.

The security officer 105 assigns a value to each of the security parameters in the base security profile 300 having a configurable value by either (i) retrieving the value from a data storage location coupled to the user terminal 200, e.g. from memory 206 or the secured data store 104, and setting the configurable value of the security parameter using the retrieved value, or (ii) associating the security parameter with an instruction to obtain the value and set the configurable value of the security parameter using the obtained value.

Any instruction associated with a security parameter in the generated security profile is actionable by either the development data package generation module 126 or the data package generation module 116, in dependence on the type of security profile being generated.

An instruction input by the security officer 105 can take many forms.

One example of an instruction which may be associated with a security parameter in the base security profile having a configurable value is an instruction that the data package generation module randomly generates the value for the security parameter. For example when generating a test and/or production profile, the security officer 105 may select to associate a public key parameter (in the base security profile), associated with a device certificate 312 for programming onto one of the target devices, with an instruction that the data package generation module 116 randomly generate a public/private key pair and set the public key parameter using the value of the randomly generated public key.

Another example of an instruction which may be associated with a security parameter in the base security profile having a configurable data package generation module retrieves the value from a remote data store, the instruction comprising an identifier of the remote data store and a data storage location on the remote data store. For example, when generating a development profile 106 the remote data store referenced in the instruction to the development data package generation module 126 may be the data store 128 or the data store 134. When generating a test and/or production profile the remote data store referenced in the instruction to the data package generation module 116 may be the secured data store 118 (in embodiments whereby the data package generation module 116 is implemented on a computing device which is remote to the user terminal 200) or the secured data store 124.

Yet another example of an instruction which may be associated with a security parameter in the base security profile having a configurable value is an instruction that the data package generation module generates the value for the security parameter using the value assigned to one or more other security parameters in the base security profile. For example, the security officer 105 may select to associate a signature parameter (in the base security profile), associated with a device certificate 312 for programming onto one of the target devices, with an instruction that the data package generation module uses a value assigned to private key parameter associated with an intermediate certificate 308 (at the level immediately above the device certificate 312 in a certificate chain 302) to encrypt a plurality of security parameters associated with the device certificate 312 (including a public key parameter associated with the device certificate 312) to generate the value for the signature parameter.

A further example of an instruction which may be associated with a security parameter in the base security profile having a configurable value is an instruction that the data package generation module generates the value for the security parameter based on a date or time at which the instruction is acted on (carried out by) the data package generation module. For example the security parameter may be certificate creation date parameter or certificate creation time parameter associated with a device certificate 312 for programming onto one of the target devices. It will be appreciated that in this example, the instruction indicates that the data package generation module is to generate the value for the security parameter without using the value assigned to one or more other security parameters in the base security profile.

Another example of an instruction which may be associated with a security parameter in the base security profile having a configurable value is an instruction that the data package generation module retrieves the value from the target device being programmed by communicating with device programming module 122,132. For example, when generating a development profile, the security officer 105 may select to associate a device serial number parameter associated with a device certificate 312 for programming onto a target device, with an instruction that the development data package generation module 126 requests that the development device programmer 132 reads a device serial number hardcoded on the device and provides the device serial number back to the development data package generation module 126, and the development data package generation module 126 sets the value of the device serial number parameter in the device certificate 312 to the read device serial number. Similarly, when generating a production profile, the security officer 105 may select to associate a device serial number parameter associated with a device certificate 312 for programming onto a target device, with an instruction that the data package generation module 116 requests that the device programming module 122 reads a device serial number hardcoded on the device and provides the device serial number back to the data package generation module 116, and the data package generation module 126 sets the value of the device serial number parameter in the device certificate 312 to the read device serial number.

Once the security profile has been generated, the security profile generation module 102 outputs the security profile at step S408, for programming at least one target device.

As will be apparent from the feedback loop in FIG. 4, a further security profile may then be generated. The further security profile may be used to program the same target device(s) that were programmed using a previously generated security profile. Alternatively, the further security profile may be used to program target device(s) that are different to the target device(s) that were programmed using a previously generated security profile.

As will be apparent from the feedback loop in FIG. 4, when a further security profile is to be generated, the security profile generation module 102 generates the further security profile using the same base security profile 300. Thus the base security profile 300 clearly indicates which security parameter(s) having a configurable value in the base security profile 300 must be assigned a value before the security profile can be generated. In the base security profile 300 the security parameter(s) having a configurable value may be associated with an undefined value to clearly indicate to the security officer 105 that the security parameter(s) must be assigned a value before a security profile can be generated. Furthermore, the security parameter(s) having a non-configurable value in the base security profile 300 prevent accidental modification of these security parameter(s) which could lead to programming errors.

Generally, any of the functions described herein can be implemented using software, firmware, hardware (e.g., fixed logic circuitry), or a combination of these implementations. The term "module" used herein generally represents software, firmware, hardware, or a combination thereof. In the case of a software implementation, the module represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. A method of providing a first security profile for programming a first target device and a second security profile for programming a second target device, the method implemented on a computing device and comprising:
   obtaining a base security profile, the base security profile defining at least one security parameter having a configurable value,
   generating a first security profile from the base security profile in response to receiving input from a user via an input device of the computing device, wherein generating the first security profile comprises, for each of the at least one security parameter, assigning the security parameter with a value of a first set of values by: (i) retrieving the value of the first set of values from a first data storage location coupled to the computing device and setting the configurable value of the security parameter using the retrieved value, or (ii) associating the security parameter with an instruction to obtain the value of the first set of values and set the configurable value of the security parameter using the obtained value, the instruction selected from one or more instructions;
   generating a second security profile from the base security profile in response to receiving further input from a user via said input device, wherein generating the second security profile comprises, for each of the at least one security parameter, assigning the security parameter with a value of a second set of values by: (i) retrieving the value of the second set of values from a second data storage location coupled to the computing device and setting the configurable value of the security parameter using the retrieved value, or (ii) associating the security parameter with an instruction to obtain the value of the second set of values and set the configurable value of the security parameter using the obtained value, the instruction selected from said one or more instructions, wherein the second set of values are different to the first set of values;
   outputting the first security profile for programming the first target device for use by a first type of user; and
   outputting the second security profile for programming the second target device for use by a second type of user different to the first type of user.

2. The method of claim 1, wherein the at least one security parameter comprises at least one digital certificate parameter associated with a digital certificate for programming onto at least one of the first target device and the second target device.

3. The method of claim 2 wherein the at least one digital certificate parameter comprises one or more of:
   an issuer name parameter having a configurable value defining an issuer of the digital certificate;
   a validity period parameter having a configurable value defining a validity period of the digital certificate;
   a subject name parameter having a configurable value defining a subject of the digital certificate;
   a public key parameter having a configurable value defining a public key of the digital certificate;
   a device serial number parameter having a configurable value defining at least one of the first target device and the second target device onto which the digital certificate is to be programmed; and
   a certificate signature parameter having a configurable value defining a signature of the digital certificate.

4. The method of claim 1, wherein the at least one security parameter comprises at least one cryptographic key parameter associated with a cryptographic key for programming onto at least one of the first target device and the second target device.

5. The method of claim 4 wherein the at least one cryptographic key parameter comprises one or more of:
   at least one symmetric key parameter having a configurable value defining a symmetric key; and
   at least one private key parameter having a configurable value defining a private key of an asymmetric key pair.

6. The method of claim 1, wherein the at least one security parameter comprises at least one processor parameter for programming a processing unit on each of the first target device and the second target device.

7. The method of claim 6 wherein the at least one processor parameter comprises one or more of:
   a debug interface parameter having a configurable value defining whether a debug interface on the processing unit is to be enabled or disabled;
   a JTAG interface parameter having a configurable value defining whether a JTAG interface on the processing unit is to be enabled or disabled;
   a USB interface parameter having a configurable value defining whether a USB interface on the processing unit is to be enabled or disabled;
   a serial interface parameter having a configurable value defining whether a serial interface on the processing unit is to be enabled or disabled;
   a networking interface parameter having a configurable value defining whether a networking interface on the processing unit is to be enabled or disabled;
   a feature enablement parameter having a configurable value defining whether a feature of application software for execution on the processing unit is to be enabled or disabled; and
   a read out parameter having a configurable value defining whether external access to memory coupled to the processing unit is to be enabled or disabled.

8. The method of claim 1, wherein a data store is coupled to the computing device, the data store comprising the first data storage location and the second data storage location.

9. The method of claim 8 wherein the data store is a secured data store.

10. The method of claim 1, wherein an unsecured data store and a secured data store are coupled to the computing device, the unsecured data store comprising the first data storage location and the secured data store comprising the second data storage location.

11. The method of claim 9, wherein the secured data store is a hardware security module.

12. The method of claim 1, wherein said one more instructions comprise at least one of:
   an instruction to generate the value randomly;
   an instruction to retrieve the value from a remote data store the instruction comprising an identifier of the remote data store and a data storage location on the remote date store;
   an instruction to generate the value using at least one value assigned to at least one further security parameter of the base security profile; and
   an instruction to generate the value based on a date or time at which the instruction is acted on; and
   an instruction to retrieve the value from the first target device or the second target device.

13. The method of claim 1, wherein the method comprises:
   outputting the first security profile for delivery to a first data package generation module, the first data package generation module configured to generate a first programming data package based on the first security profile for output to a first device programming module for programming first target device; and outputting the second security profile for delivery to a second data package generation module, the second data package generation module configured to generate a second programming data package for output to a second device programming module for programming second target device.

14. The method of claim 13, wherein the first security profile comprises at least one security parameter associated with a respective instruction, and the first data package generation module is implemented on said computing device, the method further comprising:

for each of the at least one security parameter associated with a respective instruction, the first data package generation module acting on the instruction associated with the security parameter to obtain the value of the first set of values and set the configurable value of the security parameter using the obtained value.

15. The method of claim 13, wherein the first security profile comprises a plurality of security parameters each associated with a respective instruction, and the first data package generation module is distributed across multiple computing devices including said computing device and at least one remote computing device, the method further comprising:

outputting the first security profile to a component of the first data package generation module on said computing device;

for one or more of the plurality of security parameters each associated with a respective instruction, said component of the first data package generation module (i) acting on the instruction associated with the security parameter to obtain the value of the first set of values and set the configurable value of the security parameter using the obtained value; and then (ii) outputting the first security profile to a further component of the first data package generation module on a remote computing device of at least one remote computing device.

16. The method of claim 13, wherein the first security profile is output via a communications interface of the computing device for delivery to at least one remote computing device comprising the first data package generation module.

17. The method of claim 13, wherein the second security profile comprises at least one security parameter associated with a respective instruction, and the second data package generation module is implemented on said computing device, the method further comprising:

for each of the at least one security parameter associated with a respective instruction, the second data package generation module acting on the instruction associated with the security parameter to obtain the value of the second set of values and set the configurable value of the security parameter using the obtained value.

18. The method of claim 13, wherein the second security profile comprises a plurality of security parameters each associated with a respective instruction, and the second data package generation module is distributed across multiple computing devices including said computing device and at least one remote computing device, the method further comprising:

outputting the second security profile to a component of the second data package generation module on said computing device;

for one or more of the plurality of security parameters each associated with a respective instruction, said component of the second data package generation module (i) acting on the instruction associated with the security parameter to obtain the value of the second set of values and set the configurable value of the security parameter using the obtained value; and then (ii) outputting the second security profile to a further component of the second data package generation module on a remote computing device of at least one remote computing device.

19. The method of claim 13, wherein the second security profile is output via a communications interface of the computing device for delivery to at least one remote computing device comprising the second data package generation module.

20. The method of claim 13, wherein the first data package generation module is the same as the second data package generation module, and the first device programming module is the same as the second device programming module.

21. The method of claim 13, wherein the first data package generation module and the second data package generation module are separate modules, and the first device programming module and the second device programming module are separate modules.

22. The method of claim 14 wherein the method further comprises the data package generation module:

receiving application software;

generating a programming data package based on a generated security profile and the application software, the generated security profile corresponding to the first security profile or the second security profile;

encrypting the programming data package using a transfer encryption key to generate an encrypted programming data package; and outputting the encrypted programming data package to a device programming module for programming at least one of the first target device and the second target device, the device programming module corresponding to the first device programming module or the second device programming module.

23. The method of claim 1, wherein the base security profile defines at least one security parameter having a non-configurable value.

24. A computer program product configured to provide a security profile, the computer program product being stored on a non-transitory computer readable medium, the non-transitory computer readable medium being executed on a computer processor of computer device causing the computer processor to provide a first security profile for programming at least one a first target device and a second security profile for programming a second target device by:

obtaining a base security profile, the base security profile defining at least one security parameter having a configurable value, generating a first security profile from the base security profile in response to receiving input from a user via an input device of the computing device, wherein generating the first security profile comprises, for each of the at least one security parameter, assigning the security parameter with a value of a first set of values by: (i) retrieving the value of the first set of values from a first data storage location coupled to the computing device and setting the configurable value of the security parameter using the retrieved value, or (ii) associating the security parameter with an instruction to obtain the value of the first set of values and set the configurable value of the security parameter using the obtained value, the instruction selected from one or more instructions;

generating a second security profile from the base security profile in response to receiving further input from a user via said input device, wherein generating the second security profile comprises, for each of the at least one security parameter, assigning the security parameter with a value of a second set of values by: (i) retrieving the value of the second set of values from a second data storage location coupled to the computing device and setting the configurable value of the security parameter using the retrieved value, or (ii) associating the security parameter with an instruction to obtain the value of the second set of values and set the configurable value of the security parameter using the obtained value, the instruction selected from said one or more instructions, wherein the second set of values are different to the first set of values;

outputting the first security profile for programming the first target device for use by a first type of user; and outputting the second security profile for programming the second target device for use by a second type of user different to the first type of user.

25. A computing device for providing a first security profile for programming a first target device and a second security profile for programming a second target device, the computing device comprising:

an input device; and a security profile generation module, the security profile generation module configured to:

obtain a base security profile, the base security profile defining at least one security parameter having a configurable value, generate a first security profile from the base security profile in response to receiving input from a user via said input device, wherein generation of the first security profile comprises, for each of the at least one security parameter, the security profile generation module assigning the security parameter with a value of a first set of values by: (i) retrieving the value of the first set of values from a first data storage location coupled to the computing device and setting the configurable value of the security parameter using the retrieved value, or (ii) associating the security parameter with an instruction to obtain the value of the first set of values and set the configurable value of the security parameter using the obtained value, the instruction selected from one or more instructions;

generate a second security profile from the base security profile in response to receiving further input from a user via said input device, wherein generation of the second security profile comprises, for each of the at least one security parameter, the security profile generation module assigning the security parameter with a value of a second set of values by: (i) retrieving the value of the second set of values from a second data storage location coupled to the computing device and setting the configurable value of the security parameter using the retrieved value, or (ii) associating the security parameter with an instruction to obtain the value of the second set of values and set the configurable value of the security parameter using the obtained value, the instruction selected from said one or more instructions, wherein the second set of values are different to the first set of values;

output the first security profile for programming the first target device for use by a first type of user; and output the second security profile for programming the second target device for use by a second type of user different to the first type of user.

* * * * *